United States Patent [19]
Gieswein

[11] 4,411,317
[45] Oct. 25, 1983

[54] FLOWLINE CONNECTOR

[75] Inventor: Jimmie T. Gieswein, Houston, Tex.

[73] Assignee: Cameron Iron Works, Inc., Houston, Tex.

[21] Appl. No.: 317,297

[22] Filed: Nov. 2, 1981

[51] Int. Cl.³ .......................................... E21B 43/013
[52] U.S. Cl. ..................................... 166/347; 405/169
[58] Field of Search ....................... 166/347, 344, 338; 405/169, 170; 285/18, 137 A, 315, 320, DIG. 21; 277/236, 3, 27

[56] References Cited
U.S. PATENT DOCUMENTS

| | | | |
|---|---|---|---|
| 3,047,300 | 7/1962 | Taylor et al. | 277/236 |
| 3,128,078 | 4/1964 | Kosik | 251/329 |
| 3,419,071 | 12/1968 | Williams, Jr. et al. | 166/347 X |
| 3,540,533 | 11/1970 | Morrill | 166/344 X |
| 4,178,020 | 12/1979 | Dopyera | 277/236 X |

Primary Examiner—Ernest R. Purser
Assistant Examiner—Thuy M. Bui
Attorney, Agent, or Firm—Vinson & Elkins

[57] ABSTRACT

There is disclosed apparatus for connecting separate ends of fluid conduits, without radially flexing or bending either end, by using a telescoping joint, a flange connector, a metal-to-metal seal assembly, and a lock for the metal-to-metal seal.

13 Claims, 5 Drawing Figures

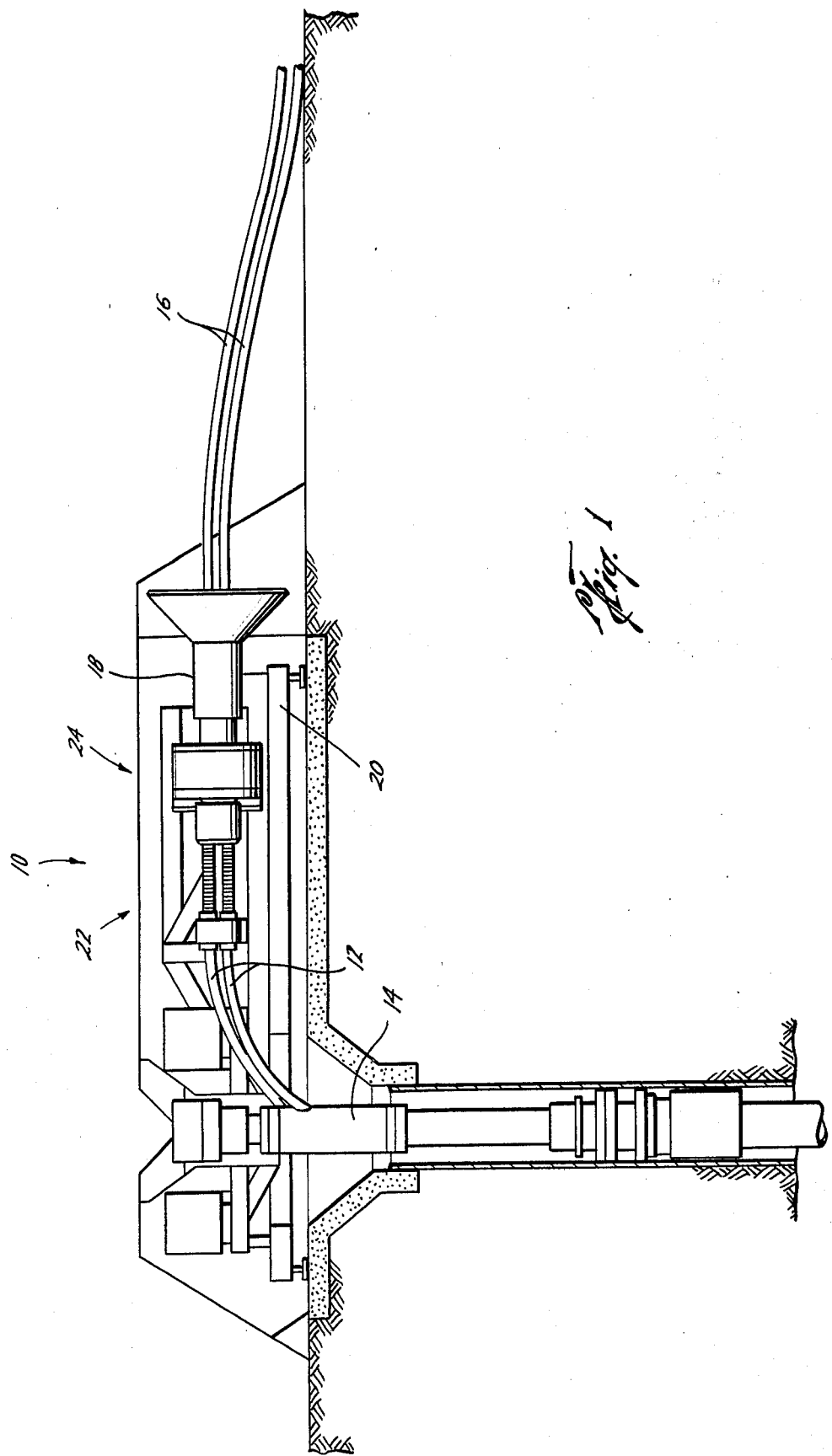

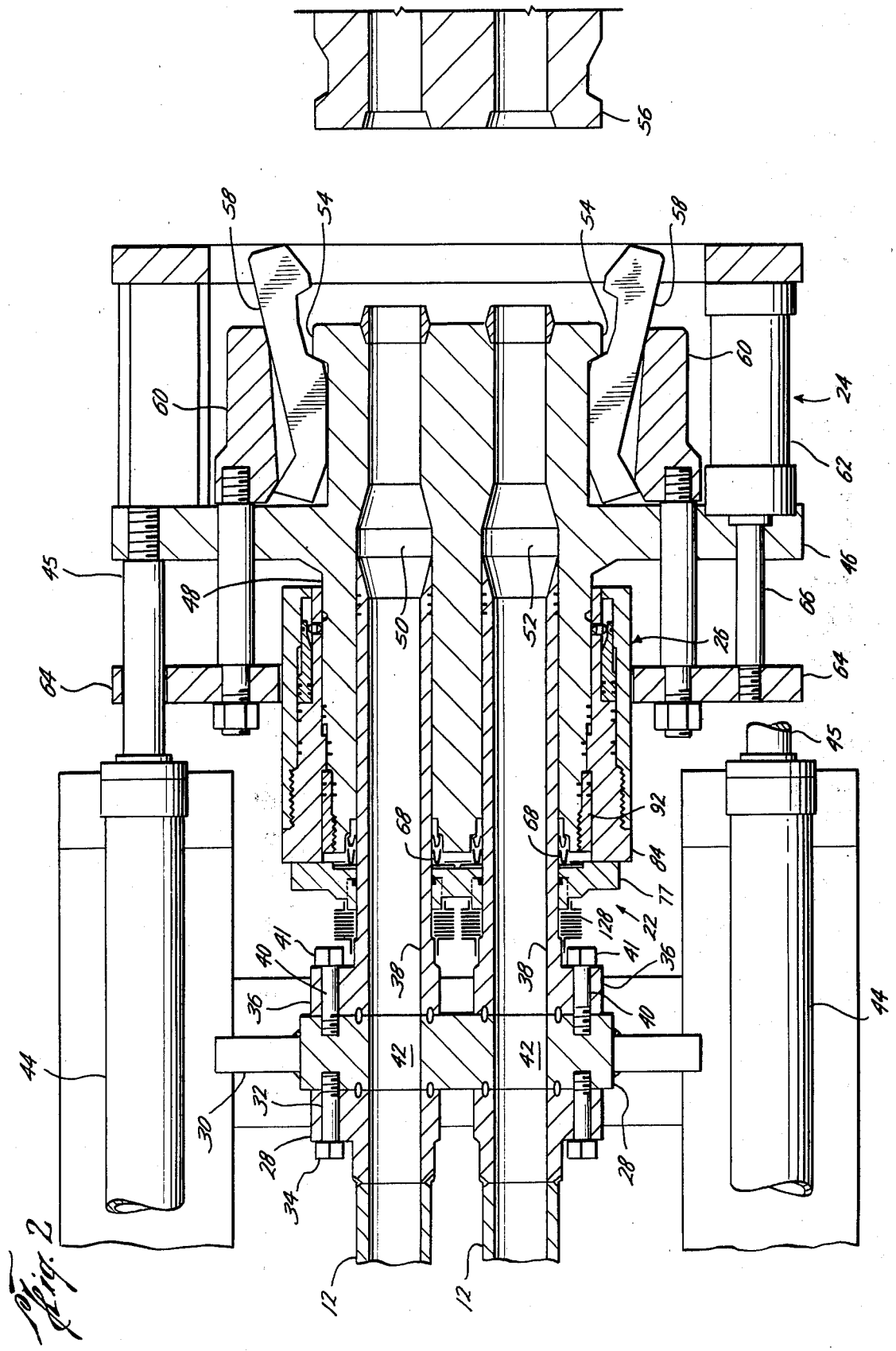

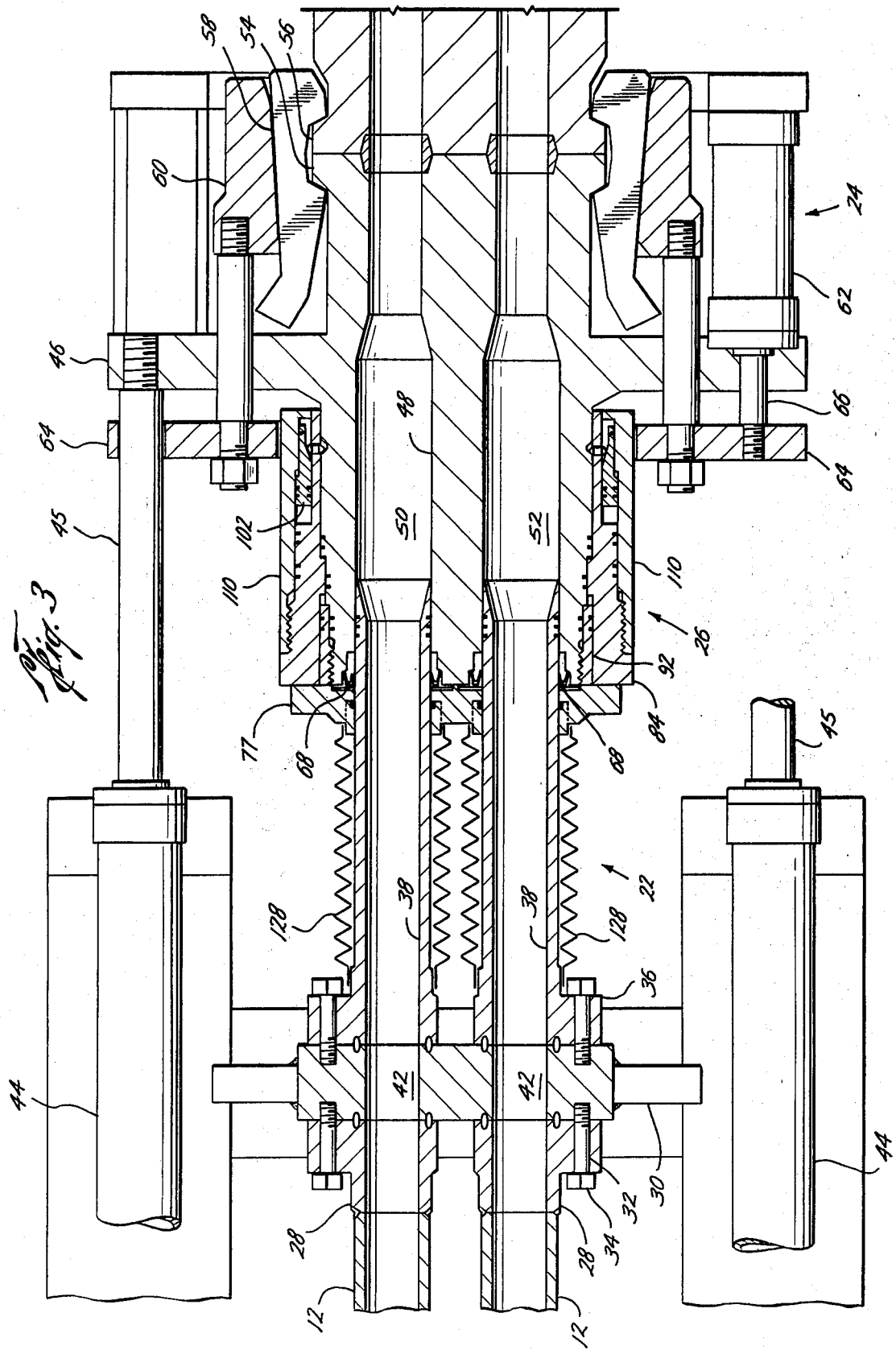

FLOWLINE CONNECTOR

BACKGROUND

Subsea flowline connections have been made by telescoping connections as shown in the R. L. Geer et al U.S. Pat. Nos. 3,052,299 and 3,233,666. Such structures rely on sealing rings for sealing of the telescoping joint. Such seals do not have the durability of metal-to-metal seals, are not either remotely actuated or actuated and are not latched in sealing position independent of the actuation of the telescoping movement.

Another example of an extensible flowline connector which is remotely actuated is shown in the J. H. Fowler U.S. Pat. No. 3,732,923 but such patent does not have a remotely and separately actuated metal-to-metal seal. Stems on valves have been protected by bellows type of extensible members as shown in the J. Kosik U.S. Pat. No. 3,128,078.

It is advantageous if the subsea wellhead may be separately installed, disconnected and recovered without disturbing the subsea flowlines.

SUMMARY

The present invention relates to an improved flowline connector and particularly to a subsea connector between wellhead production lines and subsea flowlines.

The improved flowline connector includes a telescoping metal-to-metal seal assembly which extends and retracts to connect to the flowline and a separate actuation and latching or locking of the metal-to-metal seal assembly after the remote connection is completed.

An object is to provide an improved flowline connector for connecting between a subsea wellhead and a subsea flowline which provides a positive, separately actuated, metal-to-metal seal.

A further object is to provide an improved connector for remotely connecting a subsea wellhead to a subsea flowline with a remotely actuated and latched metal-to-metal seal.

BRIEF DESCRIPTION OF THE DRAWINGS

These and other objects and advantages of the present invention are hereinafter set forth and explained with reference to the drawings wherein:

FIG. 1 is a schematic elevation view of a subsea wellhead with a subsea flowline and the improved connector of the present invention providing the flow connection therebetween.

FIG. 2 is a detail sectional view of the improved flowline connector of the present invention in its unconnected or retracted position.

FIG. 3 is a detail sectional view showing the connector in its connected and sealed position.

DESCRIPTION OF THE PREFERRED EMBODIMENT

Figure 2A:
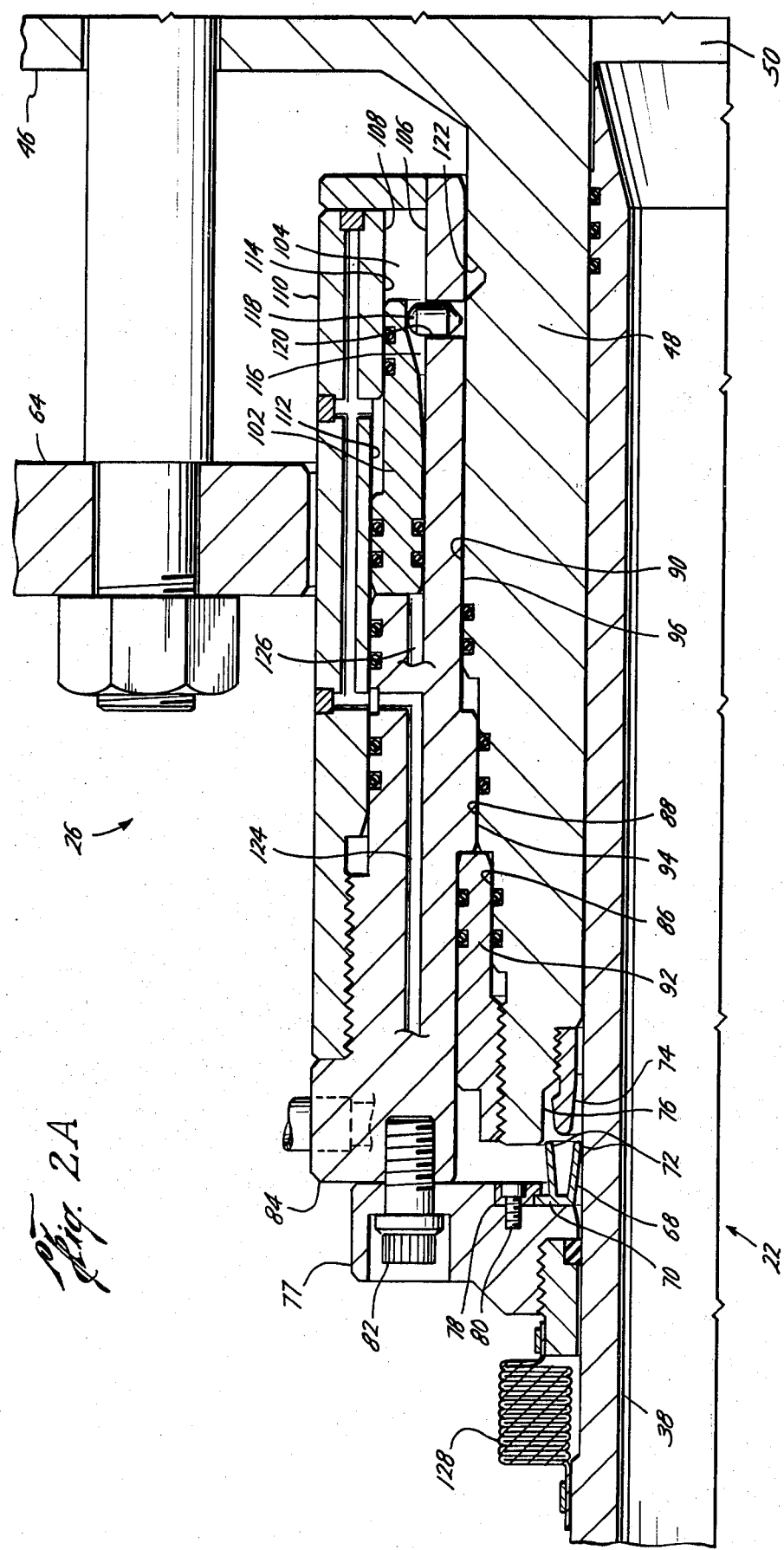
FIG. 2A is an enlarged detail sectional view of the metal-to-metal seal and its actuating mechanism in unset position.

As shown in FIG. 1, the improved flowline connector 10 of the present invention provides the flow connection between production flowlines 12 extending from wellhead 14 and subsea flowlines 16 which are held in flowline pull-in housing 18. Pull-in housing 18 is mounted on support 20 and the upper portion of wellhead 14 including lines 12 and flowline connector 10 are lowered into position with lines 12 and flowline connector 10 in axial alignment with subsea flowlines 16.

Flowline connector 10 includes an improved telescoping seal assembly 22 and remotely actuated collet connector 24. Such structure provides a remotely actuated connection between wellhead lines 12 and subsea flowlines 16 with a positive metal-to-metal seal and latching means 26 to hold seal assembly 22 in sealed position.

Lines 12 include segmented flanges 28 which are connected to actuator support flange 30 by studs 32 and nuts 34. Segmented flanges 36 on flow tubes 38 are connected to the opposite side of support flange 30 by studs 40 and nuts 41 and passages 42 extend through support flange 30 to provide flow communication between lines 12 and flow tubes 38. Actuators 44 are mounted on flange 30 with their arms 45 secured to flange 46 on member 48 to extend and retract member 48. Member 48 has internal bores 50 and 52 which receive and are slidable on flow tubes 38. The opposite end of member 48 includes collet flange 54 which is connectable to collet flange 56 on subsea flowlines 16, as hereinafter described.

Collet connector 24 is similar to collet connector shown in the Composite Catalog of Oilfield Equipment and Services 1976-77 as published by World Oil, a Gulf Publishing Company, on page 1420 and includes locking segments 58, cam 60 and cam actuators 62 which are supported on flange 46. Cam 60 are connected to plate 64 which is moved by actuator arms 66. Locking segments 58, which are responsive to movement of cam 60, engage and secure collet flanges 54 and 56 together after actuators 44 are extended.

Figure 3A:
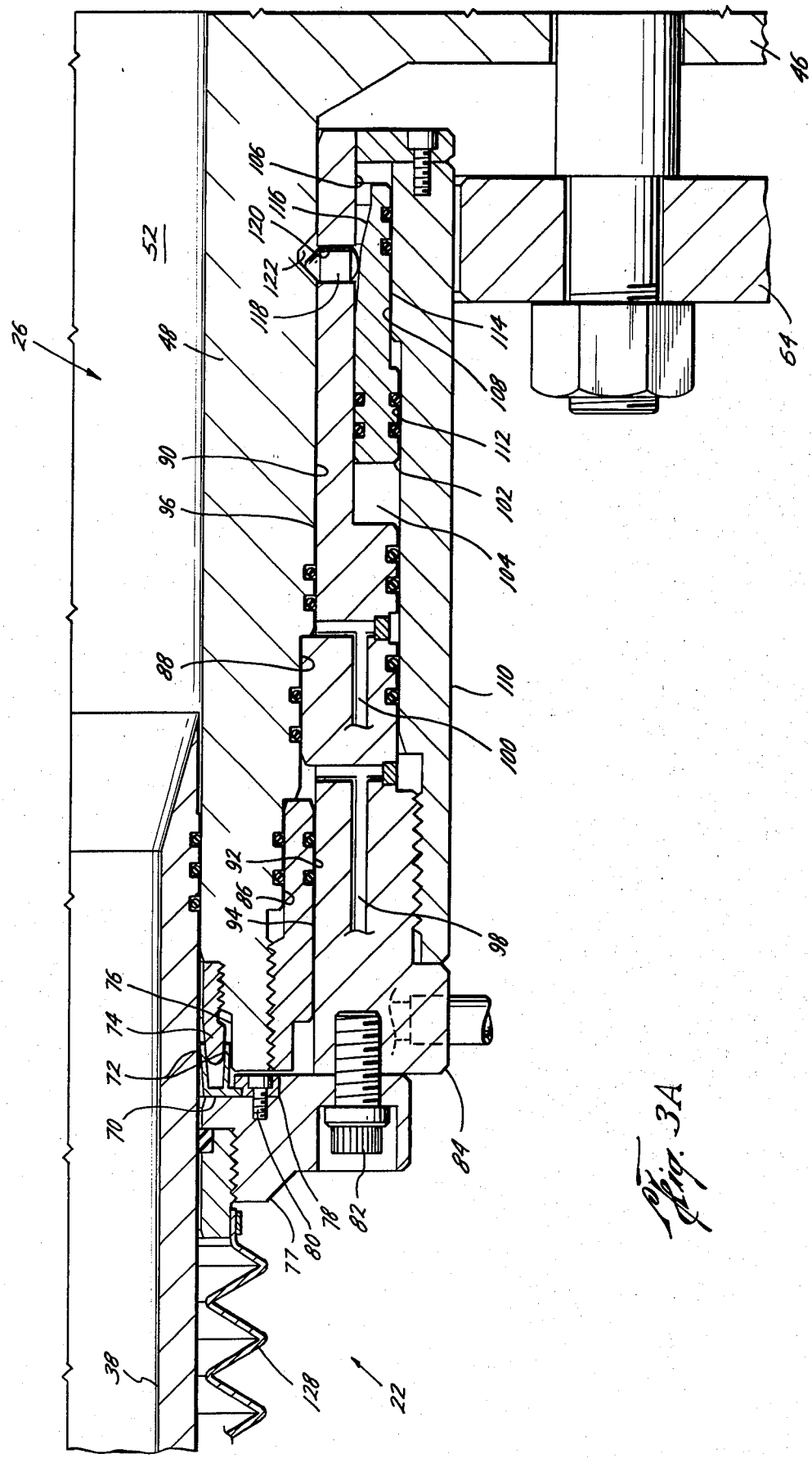
FIG. 3A is an enlarged detail sectional view of the metal-to-metal seal and its actuating mechanism in sealed and locked position.

With collet flanges 54 and 56 secured together as described above, telescoping seal assembly 22 is actuated as hereinafter described to set seal rings 68 into sealing engagement between member 48 and flow tubes 38. As shown in FIG. 2A, seal rings 68 each include base ring 70 and flanges 72. Seal rings 68 are set by moving spreader rings 74 between flanges 72 to force flanges 72 into sealing engagement with surfaces 76 on member 48 and the exterior of tubes 38. Spreader rings 74 are threaded into member 48. Seal rings 68 are supported on seal cap 77 which closely surrounds and is slidable on flow tubes 38. Plates 78 are secured to seal cap 77 by screws 80 and retain seal rings 68 in position thereon. Screws 82 secure seal cap 77 to sleeve 84 which surrounds and is slidable on the portion of member 48 receiving tubes 38. The exterior of member 48 is stepped to provide surfaces 86, 88 and 90. Ring 92 is threaded on the exterior of member 48 and seals against the interior of sleeve 84 and surface 86 of member 48. A seal is provided between surface 94 on the intermediate portion of sleeve 84 and surface 88 and a seal is provided between surface 90 on member 48 and surface 96 on sleeve 84. Port 98 (shown in FIG. 3A) is in communication through sleeve 84 with a position between surfaces 86 and 88 and port 100 is in communication through sleeve 84 with a position between surfaces 88 and 90 (See FIG. 3A). Annular piston 102 is positioned in the recess 104 between surface 106 on sleeve 84 and the interior surface 108 of sleeve 110 which is threaded onto sleeve 84 as shown. The interior of sleeve 110 is stepped to provide surfaces 112 and 114. Piston 102 is stepped to have a suitable seal against both surfaces 112 and 114 and a suitable seal is provided between piston 102 and surface 106 on sleeve 84. Piston 102 has its inner surface 116 tapered to coact with locking pins 118 in windows 120 in sleeve 84. Thus, when piston 102 has moved toward flange 46 on member 48, pins 118 are cammed into engagement with recesses 122 in surface 90 of member 48 preventing movement of sleeve 84 with respect to member 48. Port 124 (FIG. 2A) is in communication with recesses 104 to the left of piston 102 as shown in FIGS. 2 and 3 and port 126 (FIG. 2A) is in communication with the exterior of piston 102 between its seal against surface 112 and its seal against surface 106. The exterior of tubes 38 are protected by bellows 128 which are secured around tubes 38 near flange 36 and are secured at their other end to seal cap 77.

With member 48 telescoped on tubes 38 as shown in FIG. 2, its flange 54 is spaced from flange 56 on flowlines 16. When the connection is to be made, pressure is supplied to port 100 (FIG. 3A) to ensure that seal ring 68 is not energized and pressure is supplied to port 124 (FIG. 2A) to ensure that piston 102 is in its retracted or unlatched position. Pressure supplied to port 124 is exerted on the annular area between surfaces 112 and 114 to move piston 102 to the left. Also in the position shown, arms 66 of actuators 62 are extended to move cam 60 to the left which tilts segments 58 to their unlocked position.

To make the connection between production lines 12 and flowlines 16, actuators 44 are energized to their extended position to move member 48 outward bringing flange 54 into engagement with flange 56. Actuators 62 are then energized to retract their arms 66 and move cam 60 along segments 58 to force segments 58 into clamping engagement with the shoulders on flanges 54 and 56 as shown in FIG. 3.

To set seal assembly 22, pressure is supplied to port 98 which acts on the annular area between surfaces 86 and 88 to move sleeve 84 to the right or outward with respect to member 48. This movement forces seal rings 68 onto spreader rings 74 wedging flanges 72 into tight metal-to-metal sealing engagement with the exterior of tubes 38 and the interior of member 48. This separate energizing of seal assembly 22 provides a positive setting to ensure a positive metal-to-metal seal. Seal assembly 22 is latched or locked in position by supplying pressure to port 126 which moves piston 102 to the right to wedge pins 118 into engagement with recesses 122 to thereby prevent unsetting movement of sleeve 84 with respect to member 48.

Seal assembly 22 is unset by first supplying pressure to port 124 to retract piston 102 and then supplying pressure to port 100 to cause sleeve 84 to move to the left or inward with respect to member 48. This movement withdraws seal rings 68 from spreader rings 74. Member 48 can be withdrawn from engagement with lines 16 by supplying pressure to port 124 which causes actuators 62 to move cam 60 inward on locking segments 58 which movement cams segments 58 to their disengaged position out of engagement with the shoulders on flanges 54 and 56. Member 48 is then retracted by actuators 44.

What is claimed is:

1. A flowline connector for connecting between aligned, fixed, spaced-apart flowlines comprising
    a flow tube having means for connecting to one of said flowlines,
    a connector member surrounding and being slidably mounted on said flow tube and having a collet flange to mate with a collet flange on the other of said flowlines,
    means for extending and retracting said connector member with respect to said flow tube,
    means for remotely connecting the collet flange of said connector member to the collet flange on the other of said flowlines after said connector member has been extended into engagement with the other of said flowlines,
    a metal seal ring for sealing between said flow tube and said connector member, and
    pressure responsive means for actuating said seal ring to a releasable sealing position.

2. A flowline connector according to claim 1 including means for releasably locking said pressure responsive means in said sealing position.

3. A flowline connector according to claim 1 including
    an extendible sealing means connected between said flow tube near its connecting means and to said connector member.

4. A flowline connector according to claim 3 wherein said sealing means includes
    an extensible bellows surrounding said flow tube,
    means for securing one end of said bellows to said flow tube, and
    means for securing the other end of said bellows to said connector member.

5. A flowline connector according to claim 1 wherein said seal ring includes
    a base ring,
    flanges extending generally axially from the inner and outer periphery of said base ring, and
    a spreader ring supported to be received between said flanges and to force them into sealing engagement when said pressure responsive means is actuated.

6. A flowline connector according to claim 1 including
    a second flow tube,
    said connector member surrounding and being slidably mounted on said flow tubes, and
    a second metal seal ring for sealing between said second flow tube and said connector member,
    said pressure responsive means also actuating said second seal ring to a releasable sealing position.

7. A subsea wellhead structure comprising
    a production string terminating near the sea floor,
    a support structure surrounding said production string and resting on the sea floor,
    a production flowline extending from said production string,
    a flow tube connected to the end of said production flowline,
    a connector member surrounding and slidable on said flow tube,
    means for extending and retracting said connector member with respect to said flow tube,
    means for remotely connecting a flange on said connector member to a flange on the other of said flowlines after said connector member has been extended into engagement with the other of said flowlines,
    a metal seal ring for sealing between said flow tube and said connector member, and
    pressure responsive means for actuating said seal ring to a releasable sealing position.

8. A subsea wellhead according to claim 7 wherein said flanges are collet flanges.

9. A subsea wellhead according to claim 7 including
an extendible sealing means connected between said flow tube near its connecting means and to said connector member.

10. A subsea wellhead according to claim 9 wherein said sealing means includes
an extensible bellows surrounding said flow tube,
means for securing one end of said bellows to said flow tube, and
means for securing the other end of said bellows to said connector member.

11. A subsea wellhead according to claim 7 including
a second flow tube,
said connector member surrounding and being slidably mounted on said flow tubes, and
a second metal seal ring for sealing between said second flow tube and said connector member,
said pressure responsive means also actuating said second seal ring to a releasable sealing position.

12. A subsea wellhead according to claim 11 including
extendible sealing means connected between said connector member and said flow tubes.

13. A subsea wellhead according to claim 12 wherein said extendible sealing means includes
a pair of extensible bellows, each surrounding one of said flow tubes,
means for securing one end of each of said bellows to its flow tube, and
means for securing the other end of both of said bellows to said connector member.

* * * * *